(12) United States Patent
Shi et al.

(10) Patent No.: US 11,733,384 B2
(45) Date of Patent: Aug. 22, 2023

(54) SINGLE PASS PEAK DETECTION IN LIDAR SENSOR DATA STREAM

(71) Applicant: Samsung Electronics Co., Ltd., Suwon-si (KR)

(72) Inventors: Lilong Shi, Pasadena, CA (US); Yibing Michelle Wang, Pasadena, CA (US)

(73) Assignee: SAMSUNG ELECTRONICS CO., LTD.

(*) Notice: Subject to any disclaimer, the term of this patent is extended or adjusted under 35 U.S.C. 154(b) by 989 days.

(21) Appl. No.: 16/379,782

(22) Filed: Apr. 9, 2019

(65) Prior Publication Data
US 2020/0264288 A1  Aug. 20, 2020

Related U.S. Application Data

(60) Provisional application No. 62/808,280, filed on Feb. 20, 2019.

(51) Int. Cl.
*G01C 3/08* (2006.01)
*G01S 17/10* (2020.01)
(Continued)

(52) U.S. Cl.
CPC .......... *G01S 17/10* (2013.01); *G01B 9/02014* (2013.01); *G01S 7/4808* (2013.01); *G01S 7/4865* (2013.01); *G01S 17/36* (2013.01)

(58) Field of Classification Search
CPC ...... G01S 7/4865; G01S 7/4808; G01S 17/36; G01S 17/894; G01S 17/10; G01S 17/08; G01S 17/89; G01S 17/931; G01S 7/4815; G01S 7/484; G01S 7/4863; G01B 9/02014; G06V 10/751; G06M 1/101
See application file for complete search history.

(56) References Cited

U.S. PATENT DOCUMENTS

| 2014/0368613 A1 | 12/2014 | Krupka |
| 2016/0077200 A1 | 3/2016 | Hassan et al. |

(Continued)

OTHER PUBLICATIONS

Charikar, Moses, et al. Finding frequent items in data streams. Theor. Comput. Sci. 312(1): 3-15 (2004) (Year: 2004).*

(Continued)

*Primary Examiner* — Samantha K Nickerson
(74) *Attorney, Agent, or Firm* — Renaissance IP Law Group LLP (57) ABSTRACT

A system and a method determines a traveling time for a light pulse between a light pulse source and a pixel of a light sensor array based on a "Find Frequent Items in a Data Steam" technique. In one embodiment, raw timestamp data output from a pixel as a data stream may be temporarily stored, processed twice and then discarded to provide an exact determination of a traveling time estimate. In another embodiment, the raw timestamp data is processed once and discarded to provide an approximate determination of a traveling time estimate. The traveling time estimate may be updated during processing and the most-frequently occurring timestamp is available when processing the data stream is complete. There is no need to keep the raw data in a memory, thereby reducing the memory requirement associated with determining the traveling time of a light pulse.

20 Claims, 4 Drawing Sheets

(51) Int. Cl.
    *G01S 7/4865*    (2020.01)
    *G01S 7/48*      (2006.01)
    *G01B 9/02001*   (2022.01)
    *G01S 17/36*     (2006.01)

(56) References Cited

U.S. PATENT DOCUMENTS

| | | |
|---|---|---|
| 2017/0052065 A1 | 2/2017 | Sharma et al. |
| 2018/0253404 A1 | 9/2018 | Moore et al. |
| 2018/0292534 A1 | 10/2018 | Field |
| 2018/0321363 A1 | 11/2018 | Beer et al. |
| 2018/0372851 A1 | 12/2018 | Kienzler et al. |
| 2019/0018119 A1 | 1/2019 | Laifenfeld et al. |
| 2019/0041502 A1 | 2/2019 | Onal et al. |
| 2019/0056497 A1 | 2/2019 | Pacala et al. |
| 2019/0250257 A1 | 8/2019 | Finkelstein et al. |
| 2019/0277952 A1* | 9/2019 | Beuschel .............. G01S 7/4863 |
| 2020/0233066 A1 | 7/2020 | Kulesh et al. |
| 2021/0302548 A1 | 9/2021 | Chen et al. |
| 2022/0043128 A1 | 2/2022 | Pacala et al. |

OTHER PUBLICATIONS

Wang, Ke, "Towards Efficient 3D Reconstructions from High-Resolution Satellite Imagery", ProQuest Dissertations Publishing, 2018, The University of North Carolina, Chapel Hill, (URL: https://search.proquest.com/docview/2051459701), 134 pages.

Notice of Allowance for U.S. Appl. No. 16/900,810, dated Jan. 5, 2023.

Office Action for U.S. Appl. No. 16/900,810, dated Sep. 14, 2022.

\* cited by examiner

SINGLE PASS PEAK DETECTION IN LIDAR SENSOR DATA STREAM

CROSS-REFERENCE TO RELATED APPLICATION

This patent application claims the priority benefit under 35 U.S.C. § 119(e) of U.S. Provisional Patent Application No. 62/808,280, filed on Feb. 20, 2019, the disclosure of which is incorporated herein by reference in its entirety.

TECHNICAL FIELD

The subject matter disclosed herein generally relates to direct time of flight (ToF) sensors, and more particularly, to a technique for determining travel time for light pulses.

BACKGROUND

In a Light Detection and Ranging (LIDAR) based three-dimensional (3D) imaging system, generally thousands of photon-detection events may be recorded over a single frame in response to a series of laser light pulses that have been emitted from a light pulse source. Conventionally, the photon-detection events at a pixel generate timestamps that are formed into a time histogram of the photon detection events at the pixel. A traveling time of a laser pulse is then determined based on a peak of the histogram, which is used to provide an estimated distance to an object from which the laser pulses have been reflected.

One drawback associated with a conventional histogram-binning technique is the size of the memory that is needed so that a sufficient number of bins are provided for each pixel that account for the depth resolution of the system over the entire range of the system. For example, for a LIDAR camera system that measures a maximum distance of up to 40 meters with a depth resolution of 15 cm requires 280 bins for one pixel. If the light sensor array includes 128×144 pixels, the total number of bins needed would be greater than five million bins. If the LIDAR camera system were to operate at 30 frames per second (fps) with 20 laser pulses that illuminates an entire scene per frame, each pixel will output 20 timestamp values per frame, or 600 timestamp values per second. If the timestamp for each photon-detection event is 12 bits, more than 132 Mb per frame would need to be stored in the more than five-million bins each frame. As the system range increases and/or the depth resolution decreases for a LIDAR system, and as a size of the sensor array increases, the magnitude of the amount of data being processed each frame scales accordingly. Additionally, the timestamps received from a pixel during a frame will normally be clustered in just a few bins, while the remaining bins associated with the pixel are unused.

SUMMARY

An example embodiment provides a method to determine a traveling time for a light pulse between a light pulse source and a pixel of a light sensor array, the method comprising: generating a plurality of timestamp values for a plurality of light pulses traveling between the light pulse source and the pixel, each timestamp value comprising a time of flight for a corresponding light pulse to travel between the light pulse source and the pixel; and determining the traveling time of a light pulse between the light pulse source and the pixel to be a most frequent time stamp value in the plurality of timestamp values. In one embodiment, determining the traveling time between the light pulse source and the pixel comprises: initializing a value for each element in a set of elements to be equal to zero, the set of elements comprising a predetermined number of elements; initializing a value of a counter associated with each element in the set of elements; processing the plurality of timestamp values by determining whether each timestamp value equals the value of an element in the set of elements; if the value of an element in the set of elements equals zero, replacing the value of the element with the timestamp value and incrementing the value of the counter associated with the element that was replaced; if the timestamp value equals the value of an element in the set of elements, incrementing the value of the counter associated with the element having the value that equals the timestamp value; if the timestamp value does not equal the value of an element in the set of elements, decrementing the value of all of the counters associated with the elements in the set of elements; after all timestamp values in the plurality of timestamp values have been processed, initializing the value of each counter corresponding to the elements in the set of elements; determining whether each timestamp value in the plurality of timestamp values equals the value of an element of the set of elements; if the timestamp value equals the value of an element in the set of elements, incrementing the value of the counter associated with the element having the value that equals the timestamp value; and determining the element in the set of elements associated with the counter value that is a greatest to be the timestamp value representing the traveling time for a light pulse between the light pulse source and the pixel. In another embodiment, determining the traveling time between the light pulse source and the pixel comprises: initializing a value for each element in a set of elements to be equal to zero, the set of elements comprising a predetermined number of elements; initializing a value of a counter associated with each element in the set of elements; processing the plurality of timestamp values by: determining whether each timestamp value equals the value of an element in the set of elements; if the value of an element in the set of elements equals zero, replacing the value of the element with the timestamp value and incrementing the value of the counter associated with the element that was replaced; if the timestamp value equals the value of an element in the set of elements, incrementing the value of the counter associated with the element having the value that equals the timestamp value; if the timestamp value does not equal the value of an element in the set of elements, replacing the value of the element associated with a smallest counter value with the timestamp value and incrementing by 1 the value of the counter associated with the element that was replaced; and after all timestamp values in the plurality of timestamp values have been processed, determining the element in the set of elements having a greatest counter value to be the timestamp value representing the traveling time for a light pulse between the light pulse source and the pixel.

Another example embodiment provides a system to determine a traveling time for a light pulse between a light pulse source and a pixel of a light sensor array in which the system may include a plurality of registers, a plurality of counters in which each counter may be associated with a corresponding register, and a timestamp evaluator configured to determine whether each timestamp value of a plurality of timestamp values equals a value stored in one of the plurality of registers. If the value stored in a register equals zero, the timestamp evaluator replaces the value of the register with the timestamp value and increments a value of the counter associated with the register. If the timestamp value equals the value stored in a register, the timestamp evaluator increments the value of the counter associated with the register. If the timestamp value does not equal the value stored in a register, the timestamp evaluator decrements the value of all of the counters associated with all of the registers. After all timestamp values in the plurality of timestamp values have been evaluated, the timestamp evaluator may be further configured to: initialize a value of each counter, determine whether each timestamp value in the plurality of timestamp values equals the value stored in a register, if the timestamp value equals the value stored in a register, increment the value of the counter associated with the register storing the value that equals the timestamp value, and determine the timestamp value of the register associated with the value of the counter that is a greatest to be the timestamp value representing the traveling time for a light pulse between the light pulse source and the pixel.

Still another example embodiment provides a system to determine a traveling time for a light pulse between a light pulse source and a pixel of a light sensor array in which the system may include a plurality of registers, a plurality of counters in which each counter may be associated with a corresponding register, and a timestamp evaluator configured to determine whether each timestamp value of a plurality of timestamp values equals a value stored in a register. If the value stored in a register equals zero, the timestamp evaluator replaces the value of the register with the timestamp value and increments the counter associated with the register. If the timestamp value equals the value stored in a register, the timestamp evaluator increments the counter associated with the register storing the value that equals the timestamp value. If the timestamp value does not equal the value stored in a register, the timestamp evaluator replaces the value of the register with the timestamp value associated with a least count and increments by 1 the value of the counter associated with the register having the value that was replaced. After all timestamp values in the plurality of timestamp values have been evaluated, the timestamp evaluator may be further configured to determine the timestamp value stored in the register having a greatest counter value to be the timestamp value representing the traveling time for a light pulse between the light pulse source and the pixel.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides an estimated traveling time for a light pulse between a light pulse source and a pixel of a light sensor array of a direct ToF system, such as a LiDAR-based camera system. Instead of conventionally detecting peak using a histogram-binning technique that uses a sufficient number of bins that cover the range and depth resolution of the system, the subject matter disclosed herein determines an estimated travel time of a laser pulse based on a "Find Frequent Items in a Data Steam" technique. In one embodiment, the raw timestamp data output from a pixel as a data stream may be temporarily stored, processed twice and then discarded to provide an exact determination of a traveling time estimate for a light pulse between a light pulse source and a pixel. In another embodiment, the raw timestamp data, also available as a data stream, is processed once and discarded to provide an approximate determination of a traveling time estimate for a light pulse between a light pulse source and a pixel. The traveling time estimate may be updated during processing and the most-frequently occurring timestamp is available when processing the data stream is complete. There is no need to keep the raw data in a memory, thereby reducing the memory requirement associated with determining the traveling time of a light pulse in comparison to conventional histogram-binning techniques.

The accuracy of the traveling time estimate of a light pulse provided by the techniques disclosed herein is comparable to traveling-time estimates provided by conventional histogram-binning techniques. Additionally, the techniques disclosed herein provide a direct ToF system with an increased data throughput and processing speed, while having a reduced memory requirement and power consumption.

In one embodiment, multiple neighboring-value timestamp values may be inserted into the data stream that are also processed with the original timestamp data stream so that distance estimates becomes more robust and less noisy.

Figure 1:
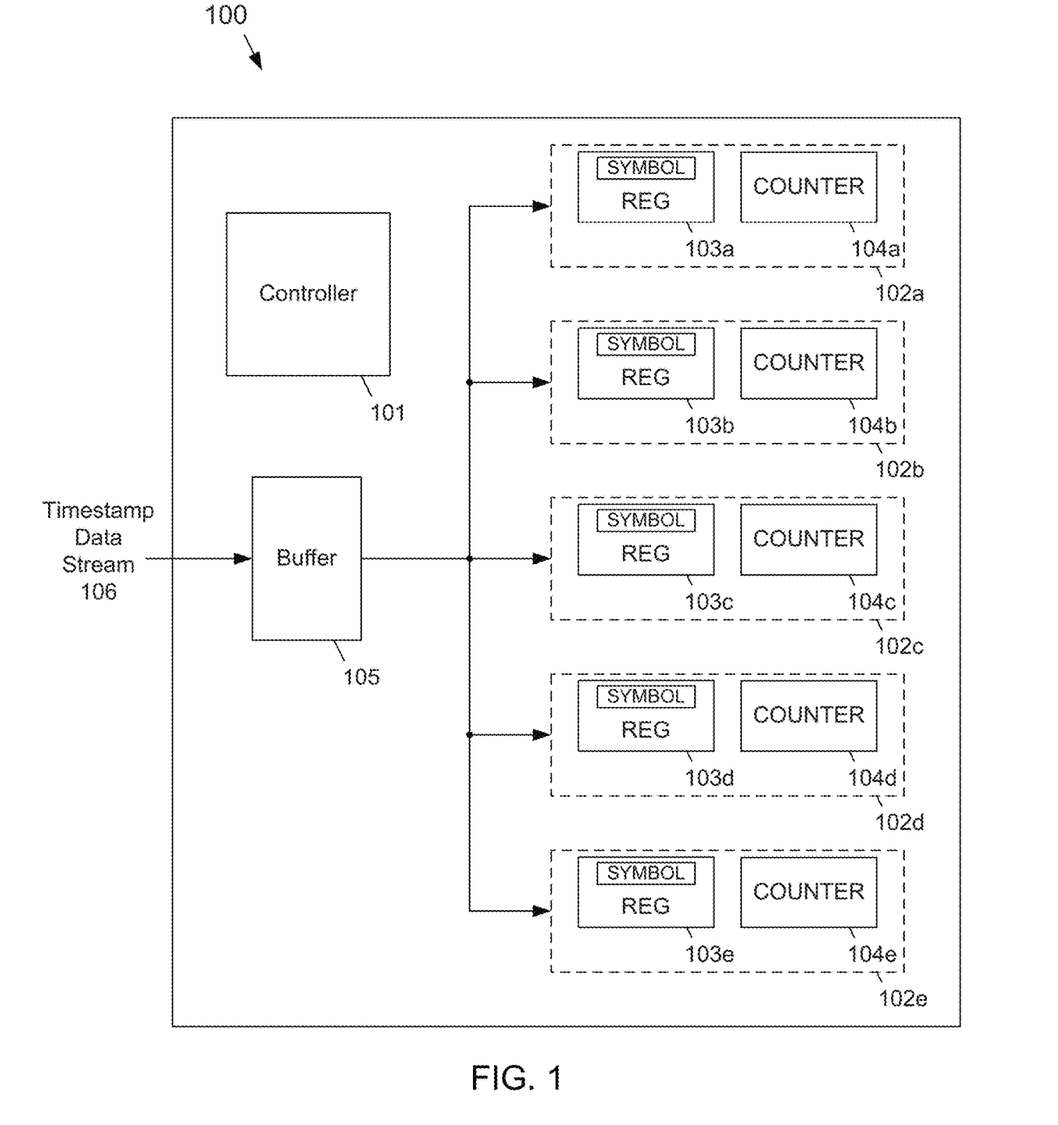
FIG. 1 depicts a functional block diagram of an example embodiment of a timestamp processing system according to the subject matter disclosed herein.

FIG. 1 depicts a functional block diagram of an example embodiment of a timestamp processing system 100 according to the subject matter disclosed herein. The system 100 processes a stream of timestamp data for a pixel (not shown) in a sensor array (also not shown). The system 100 may include a controller 101 and a plurality of register/counter pairs 102. Each register/counter pair 102 includes a register 103 and an associated counter 104. The number of register/counter pairs 102 may vary depending upon the design. As depicted in FIG. 1, the system 100 includes five register/counter pairs 102. In one embodiment, a buffer 105 may be used to receive timestamp data. The estimated traveling time of a light pulse is available as an output (although not indicated) in one of the registers 103 as determined by the associated counter that contains a maximum count value. The output from one of the registers may be made directly available from the register or may be output from the system 100 by the controller 101 externally transferring the timestamp value to a destination location or device.

Timestamp data 106 that has been output from a pixel coupled to the system 100 is input as a stream of timestamp data. As the timestamp data 106 is received, each timestamp value may be evaluated by the controller 101 and placed in one of the registers 103 of a register/counter pair 102 based on one of two "Find Frequent Items in a Data Steam" techniques, as described below. In an alternative embodiment, the timestamp data 106 is temporarily stored in the buffer 105 so that it may be processed twice to produce a more accurate distance estimate. When timestamp data for a frame has been processed, the timestamp data is discarded. In a system 100 that does not include a buffer 105; each timestamp value is discarded after being processed, whereas in a system 100 that includes a buffer 105, the timestamp values for a frame are discarded after the frame has been processed.

In one embodiment, the system 100 may be implemented as a module that may be any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), an application specific integrated circuit (ASIC), a system on-chip (SoC) and so forth.

In one embodiment, the register/counter pairs 102 are implemented as hardware components. In another embodiment, the registers 103 and counters 104 of the register/counter pairs 102 are implemented in a random access memory (RAM), in which case the functionality provided by the system 100 may be provided by software/firmware executed by the controller 101. Such an embodiment may be suitable for processing multiple streams of timestamp data output from a sensor array having many pixels, whereas if the register/counter pairs 102 are implemented as hardware components, the size of the sensor array may be limited.

Additionally, the timestamp values in the data stream 106 may be unquantized so that the traveling-time estimates provided by the system and method disclosed herein are high-precision depth measurements. In a conventional histogram-based approach, the timestamp values are typically quantized to become coarse numbers (i.e., to integers), which then are used as the indices of histogram bins. Due to the quantization, the estimated depth values lose accuracy with an extra depth error=bin_size/sqrt(12). For example, if the bin size (i.e., quantized resolution) is 1 ns, then the depth error would be 1/sqrt(12)≈0.2887 ns (or 4.33 mm if converted to distance). This quantization error can only approach 0 if the bin size becomes infinitely small. Although quantization of the timestamp values may be optional for the system and technique disclosed herein, the timestamp values may be kept as representing un-quantized high-precision floating numbers, which will provide high-precision depth measurements.

Figure 2:
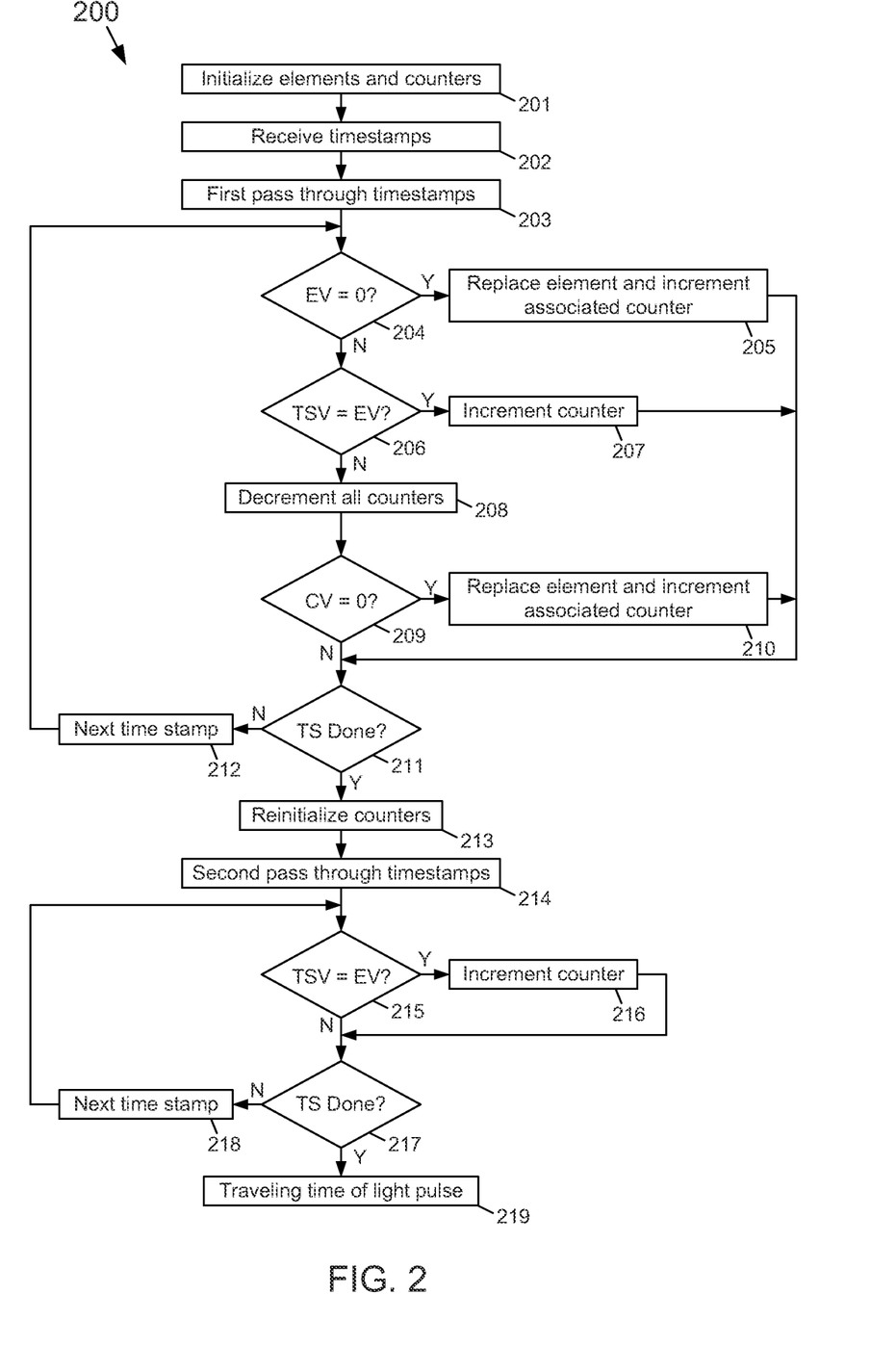
FIG. 2 is a flowchart of a first example embodiment of a method for determining an estimated traveling time for a light pulse between a light pulse source and a pixel of a light sensor array according to the subject matter disclosed herein.

FIG. 2 is a flowchart of a first example embodiment of a method 200 for determining an estimated traveling time for a light pulse between a light pulse source and a pixel of a light sensor array according to the subject matter disclosed herein. The method 200 is based on the Frequent(k) technique for finding a frequent item in a data stream, and uses two passes to process a predetermined number of timestamp values output from a pixel.

At 201, element values of a small set of elements are initialized. Additionally, a counter associated with each respective element is initialized. In one embodiment, the number of elements selected to be in the small set equals 5, and each of the elements and each of the counters are initialized to equal 0. A value stored in a counter cannot become less than 0. In another embodiment, the number of elements in the small set may be different from 5, and/or the initialization values of the elements may be different from 0, such as "null". For example, the elements may be initialized with a value that is recognizably different from any of the expected timestamps values.

At 202, a predetermined number of timestamps are received as a stream of timestamp values output from a pixel. Each pixel of a sensor array outputs a stream of timestamp values. In one embodiment, the predetermined number of timestamps that are received as a stream of data equals the number of timestamps that are generated in one frame. The timestamps may be received as a stream of timestamp data, and may be processed by the subsequent operations of the method 200. For method 200, the received timestamps may be temporarily stored in a buffer, such as the buffer 105 in FIG. 1.

At 203, all of the timestamps of plurality of timestamps are processed sequentially in a first pass through all of the timestamps. At 204, for a current timestamp value being processed, it is determined whether any of the element values (EV) equals the initialized element value of, for example, 0. If so, flow continues to 205 where the current timestamp value replaces an element value that equals the initialized element value, and the counter associated with the element is incremented by 1. In the beginning of the first pass through timestamps values, it is expected that the method 200 will follow the path through operation 205 until all of the elements have been replaced by timestamp values. From 205, flow continues to 211 where it is determined whether all of the timestamps (TS) have been processed in the first pass. If not, flow continues to 212 where the next timestamp value is selected and then returns to 204.

If, at 204, it is determined that all of the element values do not equal the initialized element value (of, for example, 0), flow continues to 206 where it is determined whether the current timestamp value (TSV) equals any of the element values (EV). If so, flow continues to 207 where the counter associated with the element containing the value that equals the current timestamp value is incremented by 1. From 207, flow continues to 211, where it is determined whether all of the timestamps (TS) have been processed. If not, flow continues to 212 where the next timestamp value is selected and then returns to 204.

If, at 206, it is determined that the current timestamp value (TSV) does not equal any of the element values (EV), flow continues to 208 where all of the counters are decremented by 1. Each counter may be decremented to 0, but if a counter value reaches zero by decrementing, the counter value remains at 0 and cannot be decremented further. After all of the initial values of the elements have been replaced by timestamp values, decrementing the counters at 207 may cause one or more of the counters to become 0. At 209, it is determined whether any of the counter values (CV) equals 0. If a counter value equals 0 at 209, flow continues to 210 where the value of the element is replaced by the current timestamp value and the associated counter is incremented. If more than one counter value equals 0, one element associated with a counter that equals 0 is replaced by the current timestamp value.

Flow continues to 211 where it is determined whether all of the timestamps have been processed. If not, flow continues to 212 where the next timestamp value is selected and then returns to 204.

If, at 211, all of the timestamp values have been processed in the first pass, the contents of the elements of the small set represent the most frequently occurring timestamp values. Flow continues to 213 where all of the counters are reinitialized to 0. At 214, the timestamps are processed for a second pass through all of the timestamps.

At 215, it is determined whether a current timestamp value (TSV) equals one of the element values (EV). If so, flow continues to 216 where the counter associated with element having the value that equals the current timestamp value is incremented.

Flow continues to 217 where it is determined whether all of the timestamps (TS) have been processed in the second pass. If not, flow continues to 218 where the next timestamp value is selected and then returns to 215. If, at 217, all of the timestamp values have been processed in the second pass, flow continues to 219 where the timestamp value in the element associated with the counter having the greatest count value represents the estimated traveling time for a light pulse between the light pulse source and the pixel. If more than one counter has the same maximum count, any of the elements associated with the counters having the maximum count may be selected. Alternatively, the element associated with the "first" counter in a predetermined selection order from counter 104a to 104e may be selected as the value for the estimated traveling time.

Table 1 sets forth example pseudocode for the method 200 of FIG. 2.

TABLE 1

$n \leftarrow 0; T \leftarrow \emptyset;$ for each $i$:

do $\begin{cases} n \leftarrow n + 1; \\ \text{if } i \in T \\ \quad \text{then } c_i \leftarrow c_i + 1; \\ \text{else if } |T| < k - 1 \\ \quad \text{then} \begin{cases} T \leftarrow T \cup \{i\}; \\ c_i \leftarrow 1; \end{cases} \\ \text{else for all } j \in T \\ \quad \text{do} \begin{cases} c_j \leftarrow c_j - 1; \\ \text{if } c_j = 0 \\ \quad \text{then } T \leftarrow T \setminus \{j\}; \end{cases} \end{cases}$ Recompute for $c$ in $T$ As mentioned, in one embodiment, the predetermined number of timestamps that are received as a stream of timestamp values may be timestamp values generated by a pixel during one frame. Each respective pass through the timestamp values processes the complete predetermined number of timestamp values. In another embodiment, the predetermined number of timestamp values may be divided into two groups, in which the first group may be processed by the first pass and the second group may be processed by the second pass. This particular embodiment in which the timestamp values are divided into two groups may not need to use the buffer 105 because the timestamp values may be processed as they are received by the system 100. Still another embodiment may divide the predetermined number of timestamps into two groups in which the second group of a frame may be processed during the first pass, and the first group of the subsequent frame may be processed during the second pass. Both of these embodiments that do not need to use the buffer 105 provide the advantage of occupying less space and using less power than an embodiment that uses the buffer 105.

In one embodiment, multiple neighboring-value timestamp values may be inserted into the data stream that are also processed with the original timestamp data stream so that distance estimates becomes more robust and less noisy. In one embodiment, the neighboring timestamps are generated based on a current timestamp value ±k, ±(k+1), ±(k+2), . . . , in which k is an integer, depending on how large a neighborhood is desired to be considered. That is, the values of each pair of neighboring timestamp values bracket the current value by a predetermined number of integer units of resolution of the timestamp values. For example, if the resolution of the timestamp values is 1 ns, k may be selected to be 1 ns. If k is selected to be 1 ns, and the size of the neighborhood is selected to be five timestamp values (the current timestamp value plus two neighbors on both sides of the current timestamp), four neighboring timestamps will be injected into the data stream for each current timestamp. The injected neighboring values are processed as if they were raw timestamp values and they tend to smooth noisy timestamp values, which may be received from a pixel. As would be expected, the additional neighboring values increase the total number of timestamp values that are processed in a frame.

Figure 3:
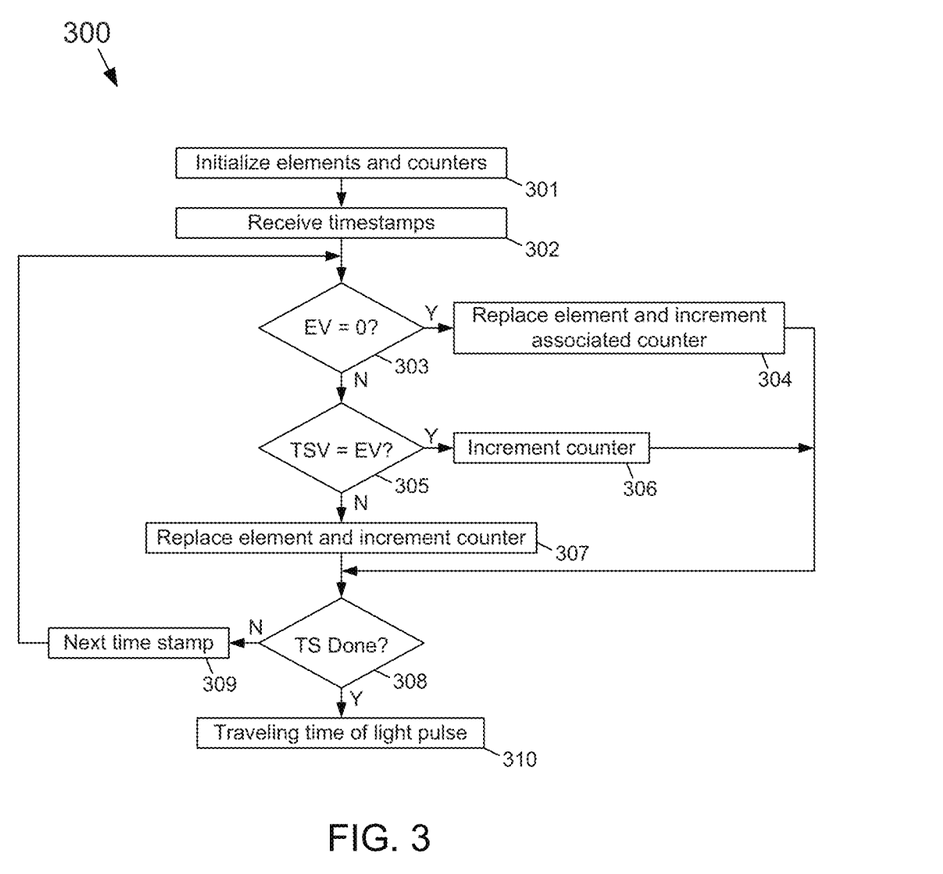
FIG. 3 is a flowchart of a second example embodiment of a method for determining an estimated traveling time for a light pulse between a light pulse source and a pixel of a light sensor array according to the subject matter disclosed herein.

FIG. 3 is a flowchart of a second example embodiment of a method 300 for determining an estimated traveling time for a light pulse between a light pulse source and a pixel of a light sensor array according to the subject matter disclosed herein. Compared to the first example embodiment shown in FIG. 2, the method 300 provides an approximated estimated traveling time of a light pulse, whereas the method 200 provides a more exact estimate of a traveling time of a light pulse. The method 300 is based on the SpaceSaving(k) technique for finding a frequent item in a data stream, and may use a single pass through a plurality of timestamp values output from a pixel. The error of the estimated traveling time provided by the method 300 may be $O(\epsilon N)$.

At 301, element values of a small set of elements are initialized. Additionally, a counter associated with each respective element is initialized. In one embodiment, the number of elements selected to be in the small set equals 5, and each of the elements and each of the counters are initialized to equal 0. A value stored in a counter cannot become less than 0. In another embodiment, the number of elements in the small set may be different from 5, and/or the initialization values of the elements may be different from 0. For example, the elements may be initialized with a value that is recognizably different from any of the expected timestamps values.

At 302, a predetermined number of timestamps are received as a stream of timestamp values output from a pixel. Each pixel of a sensor array outputs a stream of timestamp values. In one embodiment, the predetermined number of timestamps that are received as a stream of data equals the number of timestamps that are generated in one frame. The timestamps may be received as a stream of timestamp data, and may be processed by the subsequent operations of the method 300.

All of the timestamps of plurality of timestamps are processed sequentially in a single pass. At 303, for a current timestamp value being processed, it is determined whether any of the element values (EV) equals the initialized element value of, for example, 0. If so, flow continues to 304 where the current timestamp value replaces an element value that equals the initialized element value, and the counter associated with the element is incremented by 1. In the beginning of the pass through timestamps values, it is expected that the method 300 will follow the path through operation 304 until all of the elements have been replaced by timestamp values. From 304, flow continues to 308 where it is determined whether all of the timestamps (TS) have been processed. If not, flow continues to 309 where the next timestamp value is selected and then returns to 303.

If, at 303, it is determined that all of the element values do not equal the initialized element value (of, for example, 0), flow continues to 305 where it is determined whether the current timestamp value (TSV) equals any of the element values (EV). If so, flow continues to 306 where the counter associated with the element containing the value that equals the current timestamp value is incremented by 1. From 306, flow continues to 308, where it is determined whether all of the timestamps (TS) have been processed. If not, flow continues to 309 where the next timestamp value is selected and then returns to 303.

If, at 305, it is determined that the current timestamp value (TSV) does not equal any of the element values (EV), flow continues to 307 where the element associated with the smallest count is selected and replaced by the current timestamp value. The counter associated with the element that was replaced is incremented by 1. Flow continues to 308, where it is determined whether all of the timestamps (TS) have been processed. If not, flow continues to 309 where the next timestamp value is selected and then returns to 303.

If, at 308, all of the timestamp values have been processed, flow continues to 310 where the timestamp value in the element associated with the counter having the greatest count value represents the estimated traveling time for a light pulse between the light pulse source and the pixel. If more than one counter has the same maximum count, any of the elements associated with the counters having the maximum count may be selected. Alternatively, the element associated with the "first" counter in a predetermined selection order from counter 104a to 104e may be selected as the value for the estimated traveling time.

Table 2 sets forth example pseudocode for the method 300 of FIG. 3.

TABLE 2

$n \leftarrow 0;$ $T \leftarrow \emptyset;$ for each $i$:

$$do \begin{cases} n \leftarrow n + 1; \\ \text{if } i \in T \\ \text{then } c_i \leftarrow c_i + 1; \\ \text{else if} |T| < k \\ \quad \text{then} \begin{cases} T \leftarrow T \cup \{i\}; \\ c_i \leftarrow 1; \end{cases} \\ \quad \text{else} \begin{cases} j \leftarrow \text{argmin}_{j \in T} c_j; \\ c_i \leftarrow c_j + 1; \\ T \leftarrow T \cup \{i\} \backslash \{j\}; \end{cases} \end{cases}$$

FIGS. 4A-4D depict example range images and example intensity images results for a conventional histogram-binning technique in comparison to the techniques disclosed herein. The settings used to generate the images of FIGS. 4A-4D were N=20 pulses per frame, the number of elements equaled 5, the bin width was 2 ns, and the range of the system was 0-15 m.

Figure 4A:
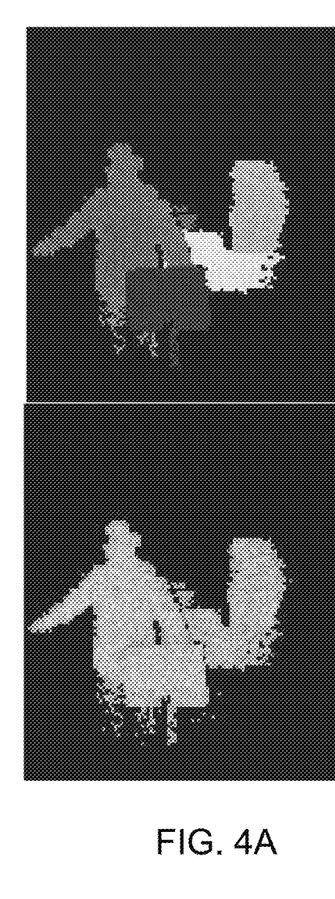
FIGS. 4A-4D depict example range images and example intensity images results for a conventional histogram-binning technique in comparison to the techniques disclosed herein.

The upper image of FIG. 4A depicts the example range image result and the lower image of FIG. 4A depicts the example intensity image result for a conventional histogram-binning technique.

Figure 4B:
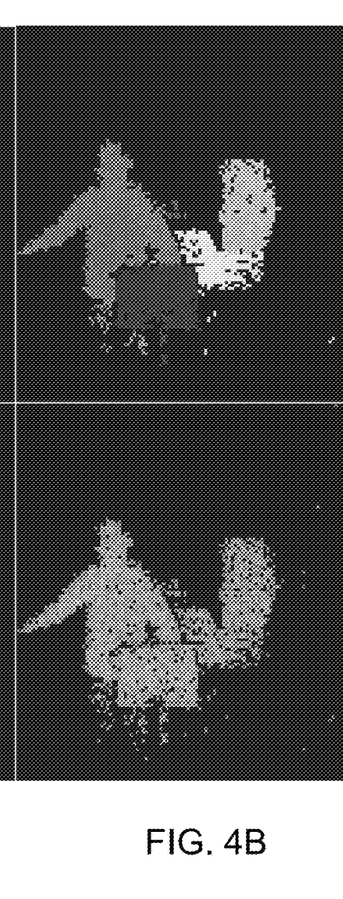

The upper image of FIG. 4B depicts the example range image result and the lower image of FIG. 4B depicts the example intensity image result for the method 200 (FIG. 2) in which half of the timestamps in a frame was used for the first processing pass and the other half was used for the second processing pass.

Figure 4C:
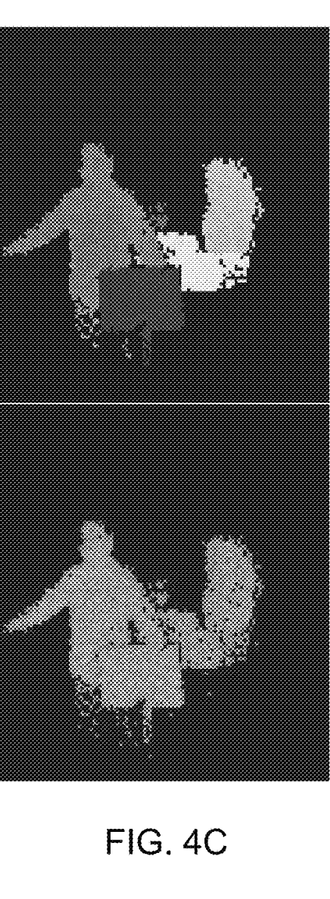

The upper image of FIG. 4C depicts the example range image result and the lower image of FIG. 4C depicts the example intensity image result for the method 200 (FIG. 2) in which all of the timestamps in a first frame were used for the first processing pass and all of the timestamps in a second subsequent frame were used for the second processing pass in a frame-to-frame-interlacing fashion. It should be noted that processing the timestamps in a frame-to-frame-interlacing fashion effectively doubles the number of timestamps processed for each frame.

Figure 4D:
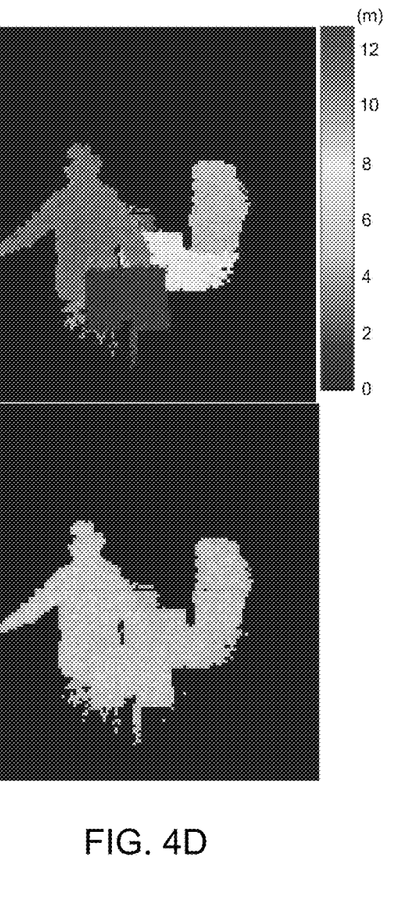

The upper image of FIG. 4D depicts the example range image result and the lower image of FIG. 4D depicts the example intensity image result for the method 300 (FIG. 3).

As can be seen from FIGS. 4A-4D, the techniques disclosed herein provide an estimated travel time for a light pulse that is comparable to the estimated travel time provided by a conventional histogram-binning technique.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to determine a traveling time for a light pulse between a light pulse source and a pixel of a light sensor array, the method comprising:
   generating a data stream of a plurality of timestamp values for a plurality of light pulses traveling between the light pulse source and the pixel, each timestamp value comprising a time of flight for a corresponding light pulse to travel between the light pulse source and the pixel; and
   determining, using a find-frequent-items-in-a-data-stream process, a most frequent occurrence of the traveling time of a light pulse between the light pulse source and the pixel to be a most frequent time stamp value in the data stream of the plurality of timestamp values by:
   initializing a value for each element in a set of elements to be equal to zero, the set of elements comprising a predetermined number of elements;
   initializing a value of a counter associated with each element in the set of elements;
   processing the plurality of timestamp values by determining whether each timestamp value equals the value of an element in the set of elements:
      replacing the value of an element with the timestamp value and incrementing the value of the counter associated with the element that was replaced based on the value of the element in the set of elements equaling zero;
      incrementing the value of the counter associated with the element having the value that equals the timestamp value based on the timestamp value equaling the value of the element in the set of elements;
      decrementing the value of all of the counters associated with the elements in the set of elements based on the timestamp value not equaling the value of an element in the set of elements;
   after all timestamp values in the plurality of timestamp values have been processed,
      initializing the value of each counter corresponding to the elements in the set of elements;
      determining whether each timestamp value in the plurality of timestamp values equals the value of an element of the set of elements;
      incrementing the value of the counter associated with the element having the value that equals the timestamp value based on the timestamp value equaling the value of an element in the set of elements; and
      determining the element in the set of elements associated with the counter value that is a greatest to be the timestamp value representing the traveling time for a light pulse between the light pulse source and the pixel.

2. The method of claim 1, wherein the plurality of timestamp values comprises a frame of timestamp values.

3. The method of claim 1, wherein the plurality of timestamp values comprises a stream of timestamp value data.

4. The method of claim 1, wherein the timestamp values comprise unquantized values.

5. The method of claim 1, wherein the plurality of timestamp values comprises a first group of timestamp values and a second group of timestamp values,
   wherein processing the plurality of timestamp values comprises using the first group of timestamp values, and
   wherein processing the plurality of timestamp values after all timestamps values in the plurality of timestamp values have been processed comprises using the second group of timestamp values.

6. The method of claim 5, wherein the first group of timestamp values comprises timestamp values from a first frame, and the second group of timestamp values comprises timestamp values from a second frame that is subsequent to the first frame.

7. The method of claim 6, wherein the first group of timestamp values and the second group of timestamp values together comprise a frame of timestamp values.

8. The method of claim 1, further comprising adding at least one pair of neighboring values to the plurality of timestamp values for each timestamp value of the plurality of timestamp values, each respective pair of neighboring values bracketing a corresponding timestamp value by a predetermined number of integer units of resolution of the timestamp values.

9. A system to determine a traveling time for a light pulse between a light pulse source and a pixel of a light sensor array, the system comprising:
   a plurality of registers;
   a plurality of counters, each counter associated with a corresponding register; and a timestamp evaluator circuit configured to determine whether each timestamp value of a plurality of timestamp values equals a value stored in one of the plurality of registers,
the timestamp evaluator circuit configured to replace the value of a register with the timestamp value and to increment a value of the counter associated with the register based on the value stored in the register equaling zero,
the timestamp evaluator circuit configured to increment the value of the counter associated with the register based on the timestamp value equaling the value stored in a register, and
the timestamp evaluator circuit configured to decrement the value of all of the counters associated with all of the registers based on the timestamp value not equaling the value stored in all of the registers, and
after all timestamp values in the plurality of timestamp values have been evaluated, the timestamp evaluator circuit further configured to:
initialize a value of each counter,
determine whether each timestamp value in the plurality of timestamp values equals the value stored in a register,
increment the value of the counter associated with a register storing a value that equals the timestamp value based on the timestamp value equaling the value stored in the register, and
determine the timestamp value of the register associated with the value of the counter that is a greatest to be the timestamp value representing the traveling time for a light pulse between the light pulse source and the pixel.

10. The system of claim 9, wherein the plurality of timestamp values comprises a frame of timestamp values.

11. The system of claim 9, wherein the timestamp values comprise unquantized values.

12. The system of claim 9, wherein the plurality of timestamp values comprises a first group of timestamp values and a second group of timestamp values,
wherein the timestamp evaluator circuit processing the plurality of timestamp values comprises using the first group of timestamp values, and
wherein the timestamp evaluator circuit further configured to:
determine whether each timestamp value of the first group of timestamp values equals a value stored in one of the plurality of registers,
replace the value of a register with the timestamp value and increment a value of the counter associated with the register based on the value stored in the register equaling zero,
increment the value of the counter associated with a register based on the timestamp value equaling the value stored in the register, and
decrement the value of all of the counters associated with all of the registers based on the timestamp value not equaling the value stored all of the registers, and
wherein after all timestamp values in the first group of timestamp values have been evaluated, the timestamp evaluator circuit further configured to:
initialize a value of each counter,
determine whether each timestamp value in the second group of timestamp values equals the value stored in a register,
increment the value of the counter associated with a register storing a value that equals the timestamp value based on the timestamp value equaling the value stored in the register, and
determine the timestamp value of the register associated with the value of the counter that is a greatest to be the timestamp value representing the traveling time for a light pulse between the light pulse source and the pixel.

13. The system of claim 12, wherein the first group of timestamp values comprises timestamp values from a first frame, and the second group of timestamp values comprises timestamp values from a second frame that is subsequent to the first frame.

14. The system of claim 9, wherein the plurality of timestamp values comprises a stream of timestamp value data.

15. The system of claim 9, wherein at least one pair of neighboring values are added to the plurality of timestamp values for each timestamp value of the plurality of timestamp values, each respective pair of neighboring values bracketing a corresponding timestamp value by a predetermined number of integer units of resolution of the timestamp values.

16. A system to determine a traveling time for a light pulse between a light pulse source and a pixel of a light sensor array, the system comprising:
a plurality of registers;
a plurality of counters, each counter associated with a corresponding register; and
a timestamp evaluator circuit configured to determine whether each timestamp value of a plurality of timestamp values equals a value stored in a register;
the timestamp evaluator circuit configured to replace the value of a register with the timestamp value and increment the counter associated with the register based on the value stored in the register equaling zero;
the timestamp evaluator circuit configured to increment the counter associated with a register storing the value that equals the timestamp value based on the timestamp value equaling the value stored in the register;
the timestamp evaluator circuit configured to replace the value of a register with the timestamp value associated with a least count and increment by 1 the value of the counter associated with the register having the value that was replaced based on the timestamp value not equaling the value stored in the register; and
after all timestamp values in the plurality of timestamp values have been evaluated, the timestamp evaluator circuit further configured to determine the timestamp value stored in the register having a greatest counter value to be the timestamp value representing the traveling time for a light pulse between the light pulse source and the pixel.

17. The system of claim 16, wherein the plurality of timestamp values comprises a frame of timestamp values.

18. The system of claim 16, wherein at least one pair of neighboring values are added to the plurality of timestamp values for each timestamp value of the plurality of timestamp values, each respective pair of neighboring values bracketing a corresponding timestamp value by a predetermined number of integer units of resolution of the timestamp values.

19. The system of claim 16, wherein the timestamp values comprise unquantized values.

20. A method to determine a traveling time for a light pulse between a light pulse source and a pixel of a light sensor array, the method comprising:

generating a data stream of a plurality of timestamp values for a plurality of light pulses traveling between the light pulse source and the pixel, each timestamp value comprising a time of flight for a corresponding light pulse to travel between the light pulse source and the pixel; and determining, using a space-saving process, a most frequent occurrence of the traveling time of a light pulse between the light pulse source and the pixel to be a most frequent time stamp value in the data stream of the plurality of timestamp values by:

initializing a value for each element in a set of elements to be equal to zero, the set of elements comprising a predetermined number of elements;

initializing a value of a counter associated with each element in the set of elements;

processing the plurality of timestamp values by:

determining whether each timestamp value equals the value of an element in the set of elements;

replacing the value of the element with the timestamp value and incrementing the value of the counter associated with the element that was replaced based on the value of the element in the set of elements equaling zero;

incrementing the value of the counter associated with the element having the value that equals the timestamp value based on the timestamp value equaling the value of an element in the set of elements;

replacing the value of the element associated with a smallest counter value with the timestamp value and incrementing by 1 the value of the counter associated with the element that was replaced based on the timestamp value not equaling the value of an element in the set of elements; and after all timestamp values in the plurality of timestamp values have been processed, determining the element in the set of elements having a greatest counter value to be the timestamp value representing the traveling time for a light pulse between the light pulse source and the pixel.

* * * * *